US012715625B2

(12) United States Patent
Guy

(10) Patent No.: US 12,715,625 B2
(45) Date of Patent: Aug. 25, 2026

(54) SYSTEMS AND METHODS FOR PAYLOAD STABILIZATION

(71) Applicant: Itay Eliahu Guy, Tel Aviv (IL)

(72) Inventor: Itay Eliahu Guy, Tel Aviv (IL)

( * ) Notice: Subject to any disclaimer, the term of this patent is extended or adjusted under 35 U.S.C. 154(b) by 286 days.

(21) Appl. No.: 18/268,644

(22) PCT Filed: Dec. 7, 2021

(86) PCT No.: PCT/IL2021/051454
§ 371 (c)(1),
(2) Date: Jun. 21, 2023

(87) PCT Pub. No.: WO2022/137227
PCT Pub. Date: Jun. 30, 2022

(65) Prior Publication Data
US 2024/0060596 A1 Feb. 22, 2024

(30) Foreign Application Priority Data
Dec. 22, 2020 (IL) .......................................... 279694

(51) Int. Cl.
*B64U 30/24* (2023.01)
*B64U 20/87* (2023.01)
(Continued)

(52) U.S. Cl.
CPC ............ *B64U 30/24* (2023.01); *B64U 20/87* (2023.01); *F16M 11/10* (2013.01); *F16M 11/14* (2013.01);
(Continued)

(58) Field of Classification Search
CPC .... B64U 30/24; B64U 20/87; B64U 2101/30; B64U 10/13; B64U 30/20; B64U 50/13;
(Continued)

(56) References Cited

U.S. PATENT DOCUMENTS 8,544,788 B1 * 10/2013 Capper ..................... B64B 1/28 244/33
8,938,160 B2 * 1/2015 Wang ................. F16M 11/2071 396/55
(Continued)

FOREIGN PATENT DOCUMENTS

CN 106233092 12/2016
CN 106275478 1/2017
(Continued)

OTHER PUBLICATIONS

Notification of Office Action and Search report Dated Jul. 29, 2025 From the State Intellectual Property Office of the People's Republic of China Re. Application No. 202180094364.9 and Its Translation in English (9 Pages).
(Continued)

*Primary Examiner* — Medhat Badawi

(57) ABSTRACT

A system for stabilizing a payload, comprising: a platform mount having a first end adapted to be physically connected to a supporting platform and a second end; a payload mount adapted to be physically connected to a payload, and is physically and rotatably connected via at least one pivot axis to the second end of the platform mount; at least one sensor adapted for measuring angular orientation of the payload along the at least one pivot axis; at least one propulsion device connected to the payload mount, and angled to change an angular position of the payload mount along the at least one pivot axis; and a stabilizing controller adapted for receiving outputs of the at least one sensor, calculating instructions for the at least one propulsion device, and forwarding the instructions to the at least one propulsion device.

19 Claims, 10 Drawing Sheets

(51) Int. Cl.
*F16M 11/10* (2006.01)
*F16M 11/14* (2006.01)
*B64U 101/30* (2023.01)
*F16M 11/12* (2006.01)

(52) U.S. Cl.
CPC ........ *B64U 2101/30* (2023.01); *F16M 11/123* (2013.01)

(58) Field of Classification Search
CPC ........... F16M 2200/041; F16M 11/123; F16M 2200/044; F16M 11/10; F16M 11/14; F16M 11/2071; F16M 11/18; B64D 47/08; B64C 39/024
See application file for complete search history.

(56) References Cited

U.S. PATENT DOCUMENTS 9,688,404 B1* 6/2017 Buchmueller ........... G05D 1/00
9,789,960 B2* 10/2017 Hoheisel ................ H04N 23/60
9,927,682 B2* 3/2018 Fisher .................... G03B 17/56
10,793,272 B2* 10/2020 Shannon .................. B64D 1/22
11,242,147 B2* 2/2022 Zvara ....................... B64D 1/22
11,447,249 B2* 9/2022 Shannon .................. B66D 1/12
11,618,625 B2* 4/2023 Anand ................... B65D 81/02 206/583
11,820,506 B2* 11/2023 Suzuki .................... B64C 27/08
11,851,154 B2* 12/2023 Gagne .................. B64D 27/353
11,975,864 B2* 5/2024 Hartkop ................. B64U 20/30
11,992,444 B1* 5/2024 Sikora .................... A61G 3/006
11,993,379 B2* 5/2024 Yamato .................... B64D 1/22
12,037,117 B2* 7/2024 Foggia .................... B64C 27/08
12,080,907 B2* 9/2024 Bell ......................... G05D 1/46
12,084,186 B1* 9/2024 Witman ................... B64D 1/22
12,091,171 B2* 9/2024 Arnold ...................... B64C 1/08
12,099,337 B1* 9/2024 Al-Husseini .......... B66C 13/085
12,100,853 B2* 9/2024 Gil .......................... F15B 15/20
12,103,682 B2* 10/2024 Blake ....................... B64D 1/12
12,145,822 B2* 11/2024 Sikora ....................... B66C 1/10
12,162,028 B2* 12/2024 Zvara ...................... B05B 12/18
12,179,902 B2* 12/2024 Blake .................... B64C 1/1415
12,258,145 B2* 3/2025 Sikora ...................... B64D 9/00
12,351,312 B2* 7/2025 Prager ...................... B64D 1/22
12,466,554 B2* 11/2025 Luthra ..................... B64D 1/12
12,515,794 B2* 1/2026 Lewin ...................... B64D 1/10
2011/0233325 A1* 9/2011 Kramer ..................... B64B 1/58 244/30
2016/0202704 A1* 7/2016 Hoheisel ................... B64B 1/22 701/4
2016/0288894 A1* 10/2016 Sehnert ..................... B64B 1/30
2017/0075351 A1* 3/2017 Liu ...................... H04N 23/685
2018/0072404 A1* 3/2018 Prager ....................... B64D 1/22
2018/0072418 A1* 3/2018 Shannon .................. B64D 1/22
2018/0362183 A1* 12/2018 Lorell .................. G03B 17/561
2019/0002125 A1* 1/2019 Bin ...................... G03B 17/561
2019/0011077 A1 1/2019 Chen et al.
2019/0179344 A1* 6/2019 Qu ....................... G05D 1/0094
2019/0276140 A1* 9/2019 Poltorak ............... B60W 20/10
2019/0373173 A1* 12/2019 Wang ................... H04N 23/661
2020/0247561 A1* 8/2020 Rivera .................. B22F 3/1115
2021/0016865 A1* 1/2021 Gagne ....................... B64B 1/44
2021/0041772 A1* 2/2021 Xie ........................ G01H 1/003
2021/0061436 A1* 3/2021 Brookes .................... B64B 1/48
2021/0061463 A1* 3/2021 Briod ..................... B64U 30/24
2021/0120176 A1* 4/2021 Wang ................... H04N 23/687
2021/0129989 A1* 5/2021 Schuett ................ G03B 15/006
2024/0060596 A1* 2/2024 Guy ....................... B64U 20/87

FOREIGN PATENT DOCUMENTS

| | | |
|---|---|---|
| CN | 111284692 | 6/2020 |
| DE | 102012107265 | 2/2014 |
| EP | 3450310 | 3/2019 |
| WO | WO 2018/107330 | 1/2018 |
| WO | WO 2020/125888 | 6/2020 |
| WO | WO 2020/167867 | 8/2020 |
| WO | WO 2022/137227 | 6/2022 |

OTHER PUBLICATIONS

International Preliminary Report on Patentability Jul. 6, 2023 From the International Bureau of WIPO Re. Application No. PCT IL2021/051454. (6 Pages).
International Search Report and the Written Opinion Dated Mar. 10, 2022 From the International Searching Authority Re. Application No. PCT/IL2021/051454. (9 Pages).
Supplementary European Search Report and the European Search Opinion Dated Oct. 9, 2024 From the European Patent Office Re. Application No. 21909707.8. (8 Pages).
Notification of Office Action and Search report Dated Mar. 31, 2026 From the State Intellectual Property Office of the People's Republic of China Re. Application No. 202180094364.9 with its Summary and Machine Translation in English (19 Pages).

* cited by examiner

FIG. 5
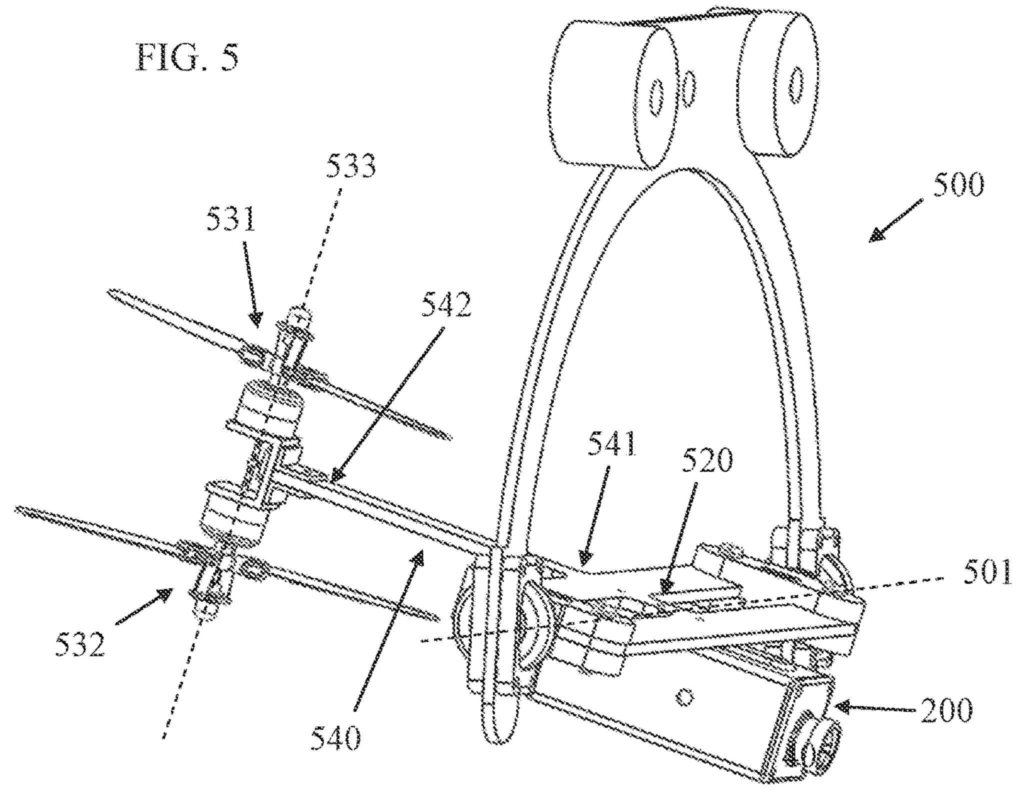
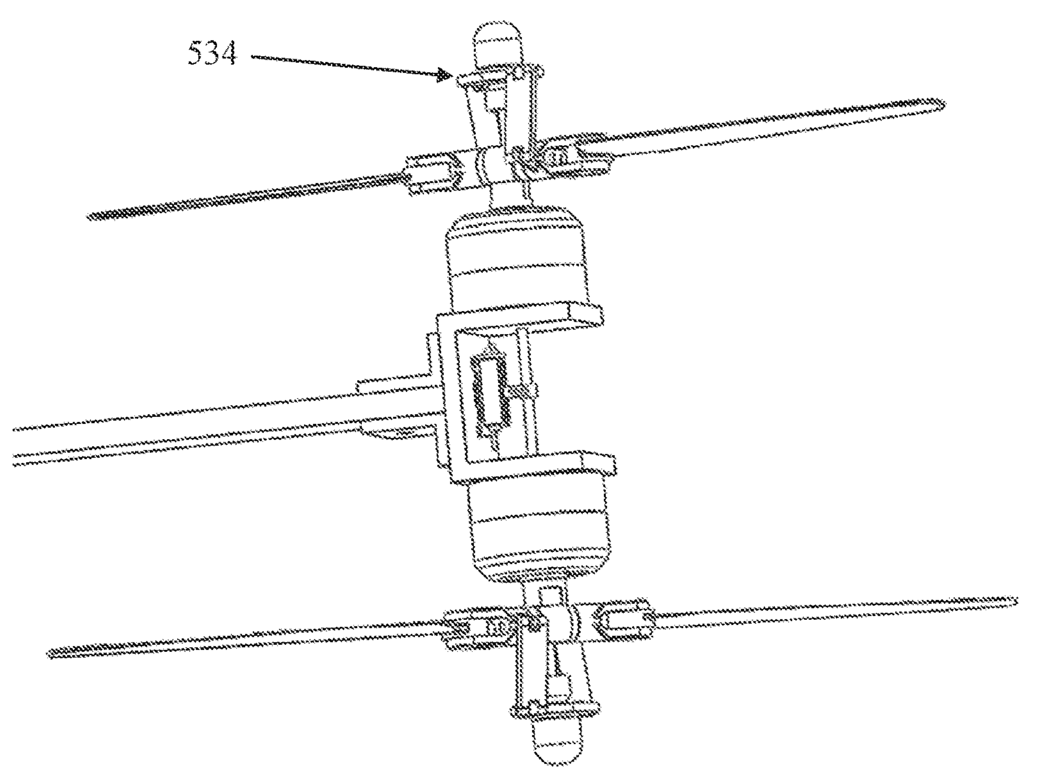
FIG. 6

SYSTEMS AND METHODS FOR PAYLOAD STABILIZATION

RELATED APPLICATIONS

This application a National Phase of PCT Patent Application No. PCT/IL2021/051454 having International filing date of Dec. 7, 2021, which claims the benefit of priority of Israel Patent Application No. 279694 filed on Dec. 22, 2020. The contents of the above applications are all incorporated by reference as if fully set forth herein in their entirety.

FIELD AND BACKGROUND OF THE INVENTION

The present invention, in some embodiments thereof, relates to systems and methods for stabilizing a payload and, more particularly, but not exclusively, to a gimbal attached to a platform and stabilizes a payload independently.

In many applications, payload systems such as cameras or aiming devices are mounted on platforms such as vehicles. These vehicles are typically not stable platforms for mounting such payload systems, and the accuracy of the payload systems can be greatly reduced when the corresponding vehicle is moving. The usual practice is to mount the payload in or on a gimbal system stabilizes the payload.

SUMMARY OF THE INVENTION

According to an aspect of some embodiments of the present invention there is provided a system for stabilizing a payload, comprising: a platform mount having a first end adapted to be physically connected to a supporting platform and a second end; a payload mount adapted to be physically connected to a payload, and is physically and rotatably connected via at least one pivot axis to the second end of the platform mount; at least one sensor adapted for measuring angular orientation of the payload along the at least one pivot axis; at least one propulsion device connected to the payload mount, and angled to change an angular position of the payload mount along the at least one pivot axis; and a stabilizing controller adapted for receiving outputs of the at least one sensor, calculating instructions for the at least one propulsion device, and forwarding the instructions to the at least one propulsion device; wherein the at least one propulsion device changes the angular position of the payload mount in the at least one pivot axis according to the received instructions while the supporting platform maneuvers independently of the movements of the payload.

Optionally, the system further comprises at least one rod perpendicular to the at least one axis, wherein the at least one rod having a first end connected to the payload mount and a second end connected to the at least one propulsion device.

Optionally, the system further comprises at least one rod perpendicular to the at least one pivot axis, wherein the at least one rod is having a middle section connected to the payload mount and two ends, each connected to at least one of at least two propulsion devices.

Optionally, the at least two propulsion devices are located at equal distance from the at least one axis.

Optionally, the payload mount include a rigid structure, and wherein the payload is connected to the center of the rigid structure, and at least four propulsion devices are connected to outer edges of the rigid structure.

More optionally, the rigid structure is x-shaped.

Optionally, the payload mount is connected to the second end of the platform mount via at least two concentric structures having orthogonal pivot axes.

Optionally, the at least one propulsion device includes at least on rotor, and the calculated instructions include instructions to change at least one of a rotation speed of the rotor and an angle of blades of the rotor.

Optionally, the at least one propulsion device includes two coaxial rotors having the same axis of rotation and opposite direction of rotation.

More optionally, the two coaxial rotors having spoon-shaped blades.

Optionally, the at least one propulsion device includes a rotor having a swashplate which translates the received instructions into an angle of each blade of the rotor.

Optionally, payload mount is connected to the second end of the platform mount via at least one bearing which is positioned to allow movement along the at least one pivot axis.

Optionally, the payload mount is connected to the second end of the platform mount via a ball joint which allows rotational movement along at least two axes.

Optionally, the calculating includes calculating at least one of linear force, torque and drag created by each of the at least one propulsion device.

Optionally, the calculation includes summing linear forces created by the at least one propulsion device and the instructions are calculated to minimize the sum of the linear forces.

Optionally, the calculation includes summing torques created by the at least one propulsion device and the instructions are calculated to minimize the sum of the torques.

More optionally, the sum of the linear forces is smaller than a weight of the payload and the system.

Optionally, the system further comprises at least one power source which is powering at least one of the at least one propulsion device, the at least one sensor and the stabilizing controller.

Optionally, the supporting platform is controlled by a control processor, and wherein instructions created by the control processor are independent of the movements of the payload.

Optionally, the angular orientation is measured relative at least one of earth, a fixed object and the supporting platform.

Optionally, the at least one pivot axis includes at least one of pitch, roll and yaw.

Optionally, the payload includes an imaging device.

Optionally, the supporting platform is an unmanned aerial vehicle (UAV).

Optionally, the at least one sensor includes at least one of an accelerometer, a gyroscope a magnetometer, an imaging device and an inertial measurement unit (IMU).

According to an aspect of some embodiments of the present invention there is provided a method of stabilizing a payload, comprising: receiving outputs of at least one sensor, the at least one sensor is adapted for measuring angular orientation of a payload along the at least one pivot axis; calculating instructions for at least one propulsion device based on the received input; forwarding the instructions to at least one propulsion device which is connected to a payload mount supporting the payload, the payload mount is physically and rotatably connected via the at least one pivot axis to a platform mount physically and rigidly connected to a supporting platform; wherein the at least one propulsion device changes the angular position of the payload mount in the at least one pivot axis according to the received instructions while the supporting platform maneuvers independently of the movements of the payload.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 5 is a schematic illustration of a system for stabilizing a payload, having coaxial rotors, according to some embodiments of the present invention;

FIG. 6 is an enlarged view of the rotors of the system of FIG. 5, according to some embodiments of the present invention;

DESCRIPTION OF EMBODIMENTS OF THE INVENTION

Figure 1:
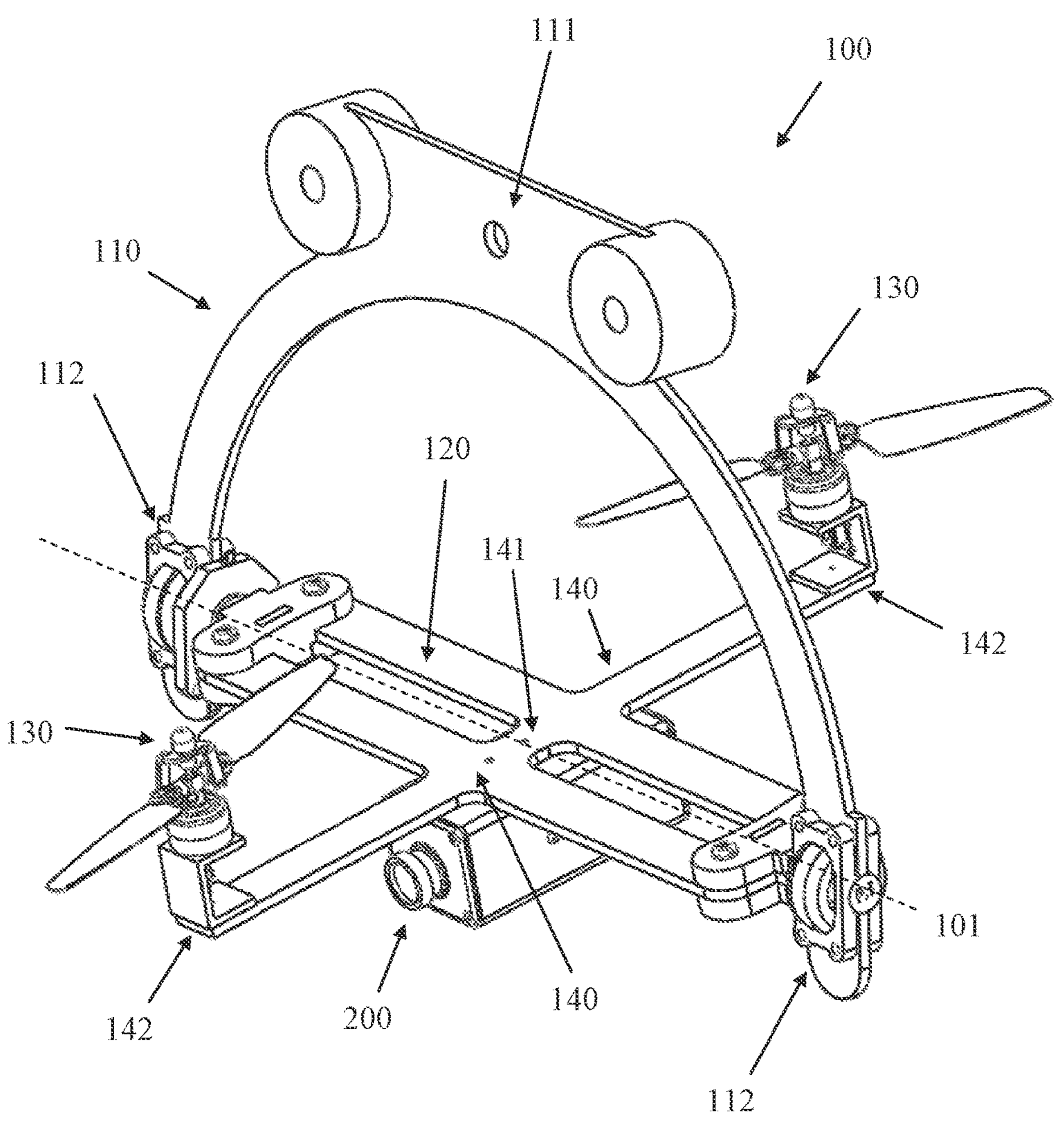
FIG. 1 is a schematic illustration of a system for stabilizing a payload, according to some embodiments of the present invention.

The present invention, in some embodiments thereof, relates to systems and methods for stabilizing a payload and, more particularly, but not exclusively, to a gimbal attached to a platform and stabilizes a payload independently.

In some applications, a payload is mounted on a platform which is sensitive to outside forces, for example when the platform is an aerial vehicle which is actively stabilized, such as a drone. In these cases, the motion of a gimbal aimed to stabilize a payload attached to the gimbal, may affect the platform or interfere with the stabilization of the platform by creating a coupling feedback loop. A common solution for this situation is to control the gimbal via the control system of the platform, thereby synchronizing the movements. However, this solution is difficult to implement and is not applicable when the gimbal is added as an independent system to the platform.

According to some embodiments of the present invention, there is provided a stabilization system (gimbal) which operates independently from a platform on which it is mounted. The gimbal includes propulsion devices (such as rotors) which are pushing against the surrounding air for stabilization, and not against the platform itself. The propulsion devices are positioned and operated in such a way which minimizes and even cancels linear forces, and changes the angular position of the payload by torque created by the propulsion devices around a specific axis or axes but do not affect the motion of the supporting platform.

The stabilization system includes sensor(s) which is measuring the angular orientation of the payload, and a controller which receives outputs from the sensor(s) and sends instructions to the propulsion devices, which are stabilizing the payload accordingly. The controller calculates linear force, torque and drag created by each of the propulsion devices, and minimizes the forces applied by the stabilization system on the platform. The sum of forces of all propulsion devices is smaller than the weight of the payload and the system (for example up to half of the weight), so the stabilization system cannot lift the payload by itself into the air.

Optionally, the system is designed so that for every propulsion device there is a corresponding propulsion device which is creating forces and/or torques that are inverse/opposite in direction to the forces and/or some of the torques created by the former propulsion device. With this structure, any residual or undesired forces may be cancelled so they are not affecting the platform. Any torques which may be transferred to the platform are undesired. These undesired torques may be cancelled by inverse/opposite torques. On the other hand, torques along specific axis/axes with frictionless connection, for example axes having bearings between the payload and the supporting platform, cannot be transferred to the supporting platform. These torques may be desired and may be used to control the orientation of the payload. For example, a spinning rotor creates torque perpendicular to the spinning plane, the torque is cancelled by the force of a counter spinning rotor so no residual torque is transferred to the supporting platform. For another example, when there are two forces around a frictionless axis, one force is up and the other force is down, the sum of forces is zero, but the torque is not zero.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 2:
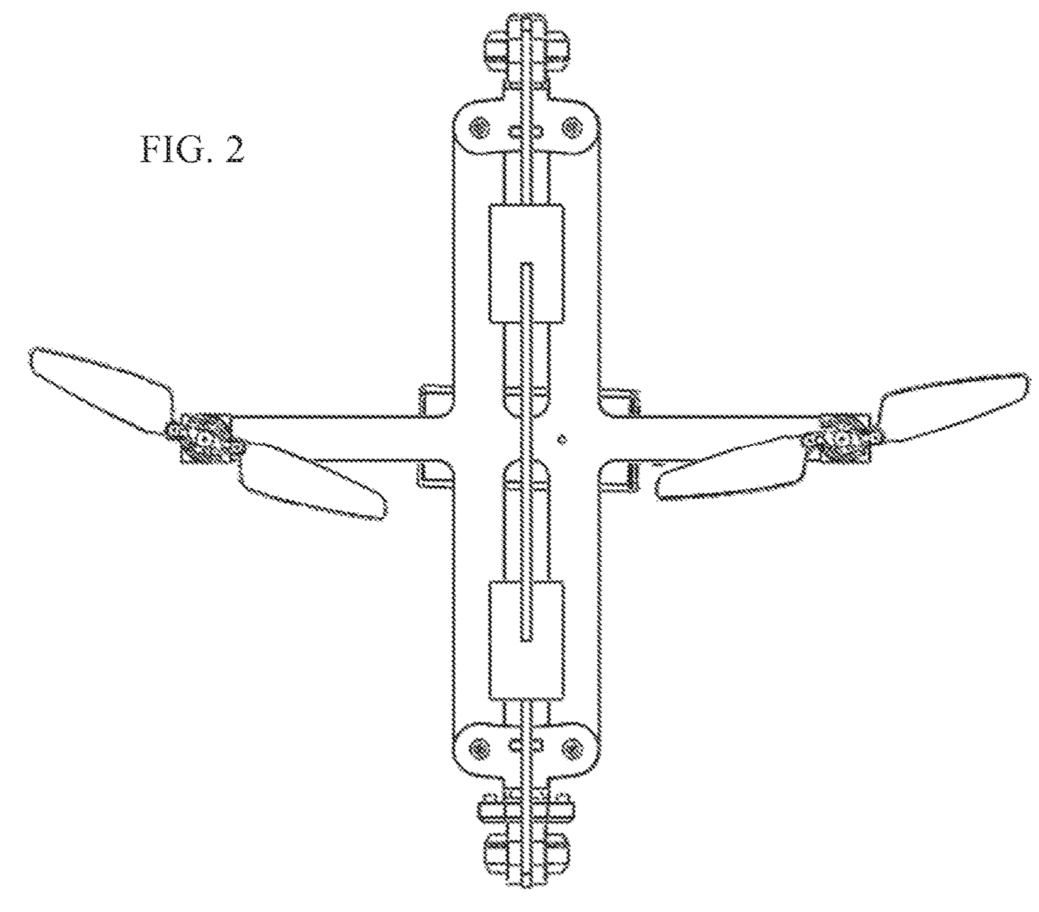
FIG. 2 and FIG. 3 are schematic illustrations of the system of FIG. 1 at a top view and a side view, respectively, according to some embodiments of the present invention.
Figure 3:
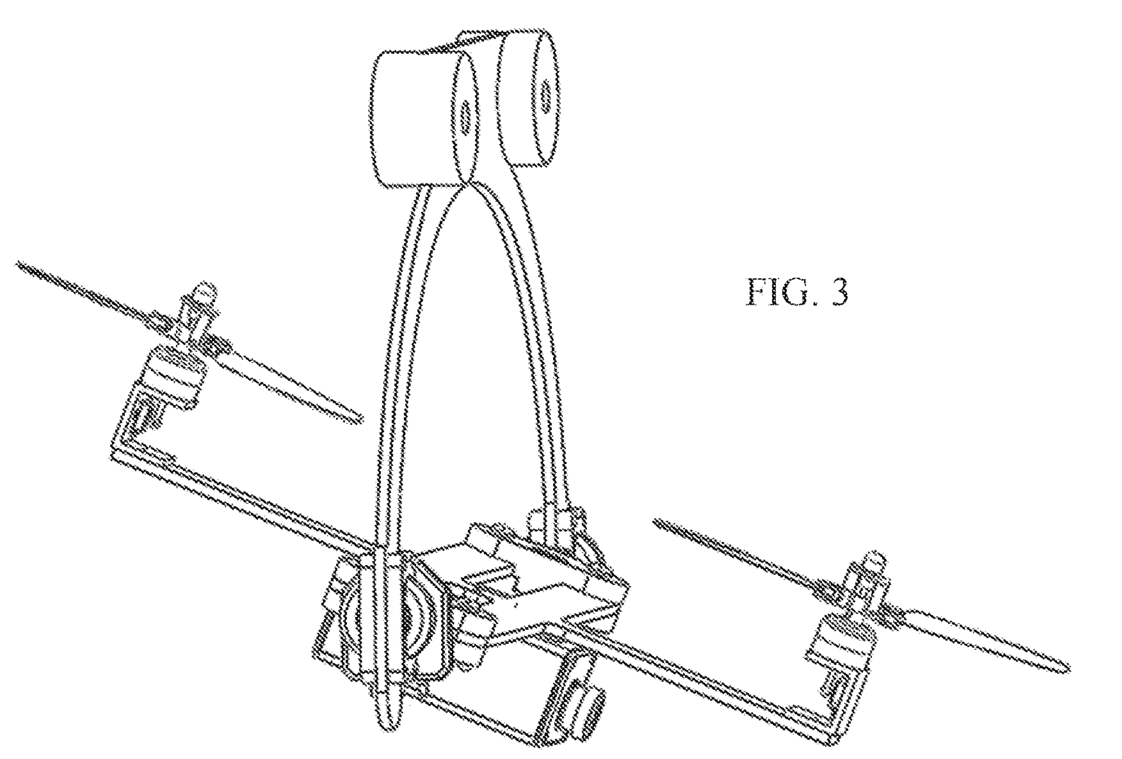

Referring now to the drawings, FIG. 1 is a schematic illustration of a system for stabilizing a payload, according to some embodiments of the present invention. Reference is also made to FIG. 2 and FIG. 3, which are schematic illustrations of the system of FIG. 1 at a top view and a side view, respectively, according to some embodiments of the present invention.

The system 100 includes a platform mount 110 adapted to be physically connected to a supporting platform via a first platform mount end 111, and a payload mount 120 adapted to be physically connected to a payload 200.

The supporting platform may include, for example, an unmanned aerial vehicle (UAV) such as a drone, an aerial vehicle such an airplane, a watercraft such as a boat or an unmanned surface vehicle (USV), a land vehicle such as a car or a tilting vehicle, and/or any other vehicle. Optionally, the system 100 is mounted on a platform which is not a vehicle.

The payload may include any device or system which may be carried by a supporting platform and has to be stabilized for proper operation, for example, an imaging device, a laser source, a radar transmitter, an aiming device, sensors and/or any other equipment.

The payload mount 120 is physically and rotatably connected via a pivot axis 101 to a second platform mount end 112 of the platform mount 110. The pivot axis 101 may be, for example, one of pitch, roll and yaw of the supporting platform.

Optionally, the payload mount 120 is connected to the second platform mount end 112 via one or more bearings 113 which are positioned to allow movement of payload mount 120 relative to platform mount 110 along the pivot axis 101. Ideally, the bearings 113 have very low internal friction, so almost no moment is transferred to the supporting platform.

The system 100 also includes one or more propulsion devices, in this case two propulsion devices 130, connected to the payload mount 120. The propulsion devices 130 are angled to change the angular position of the payload mount 120 along the pivot axis 101. The propulsion devices are located at a distance from the pivot axis 101, so they are not directly rotating the payload mount 120 relative to the platform mount 110.

The propulsion device(s) may include any kind of device generating thrust against air or water, for example a rotor operated by an engine or a turbine, a jet engine, rocket engine and/or any other propulsion technology.

Optionally, the system 100 also includes a rod 140, which is perpendicular to the pivot axis 101. The rod 140 has a middle section 141 connected to the payload mount 120 and two ends 142, each connected to one of the propulsion devices 130. Optionally, the middle section 141 is positioned on the pivot axis 130 and the two propulsion devices 130 are positioned at equal distance from the pivot axis 101.

The system 100 also includes one or more sensor(s) (not shown in FIG. 1) adapted for measuring angular orientation of the payload 200 along the pivot axis 101. The sensor may include, for example, an accelerometer, a gyroscope a magnetometer, an imaging device, an inertial measurement unit (IMU), a local azimuth sensor and/or any other sensor for angular measurement which may be used to calculate the angular orientation. The angular orientation may be measured relative to earth, may be measured relative to a fixed object such as an object captured by an imaging device, and/or may be measured relative to the supporting platform. Optionally, angular orientation of the supporting platform relative to earth may be received from the platform control system, and then an angular orientation relative to earth may be calculated from the measured orientation relative to the supporting platform and the received platform angular orientation relative to earth.

The system 100 also includes a stabilizing controller (not shown) adapted for receiving outputs from the sensor, calculating instructions for the propulsion devices 130 to change the angular position of the payload mount 120, and forwarding the instructions to the propulsion device 130. Optionally, when the propulsion devices 130 include rotors, the stabilizing controller controls the rotation speed of the rotor and/or the angle of blades of the rotor.

The stabilizing controller may include a processor which executes software that includes instructions for performing a method according to some embodiments of the present invention. The processor may include one or more processors arranged for parallel processing, such as clusters and/or as one or more multi core processor(s), and/or any other processing hardware. The controller may also include a communication module, which may connect to a control system of the supporting platform and/or to a remote processor.

Optionally, the calculating includes calculating linear force, torque and/or drag created by each of the propulsion devices 130. Optionally, the calculation includes summing linear forces and/or torques created by the propulsion devices 130. The instructions are calculated so the resulting movements of the propulsion devices 130 minimize the sum of the linear forces and/or torques applied by the propulsion devices 130 on the platform mount 110, so the platform maneuvers independently of the movements of the payload. When the platform is controlled by a control processor, the instructions created by the control processor are independent of the movements of the payload and are affected by the control of the system 100.

Optionally, the stabilizing controller is connected to a communication unit included in the system 100. The stabilizing controller may receive instructions from a remote device via the communication unit, for example receive a reference point for stabilization.

Optionally, the propulsion device(s), the sensor(s) and/or stabilizing controller are powered by one or more power source(s) which are included in the system 100, so no power connection to the supporting platform is needed. The power source(s) may include, for example, a battery, a solar panel and/or any other source of electricity or other energy.

Figure 4:
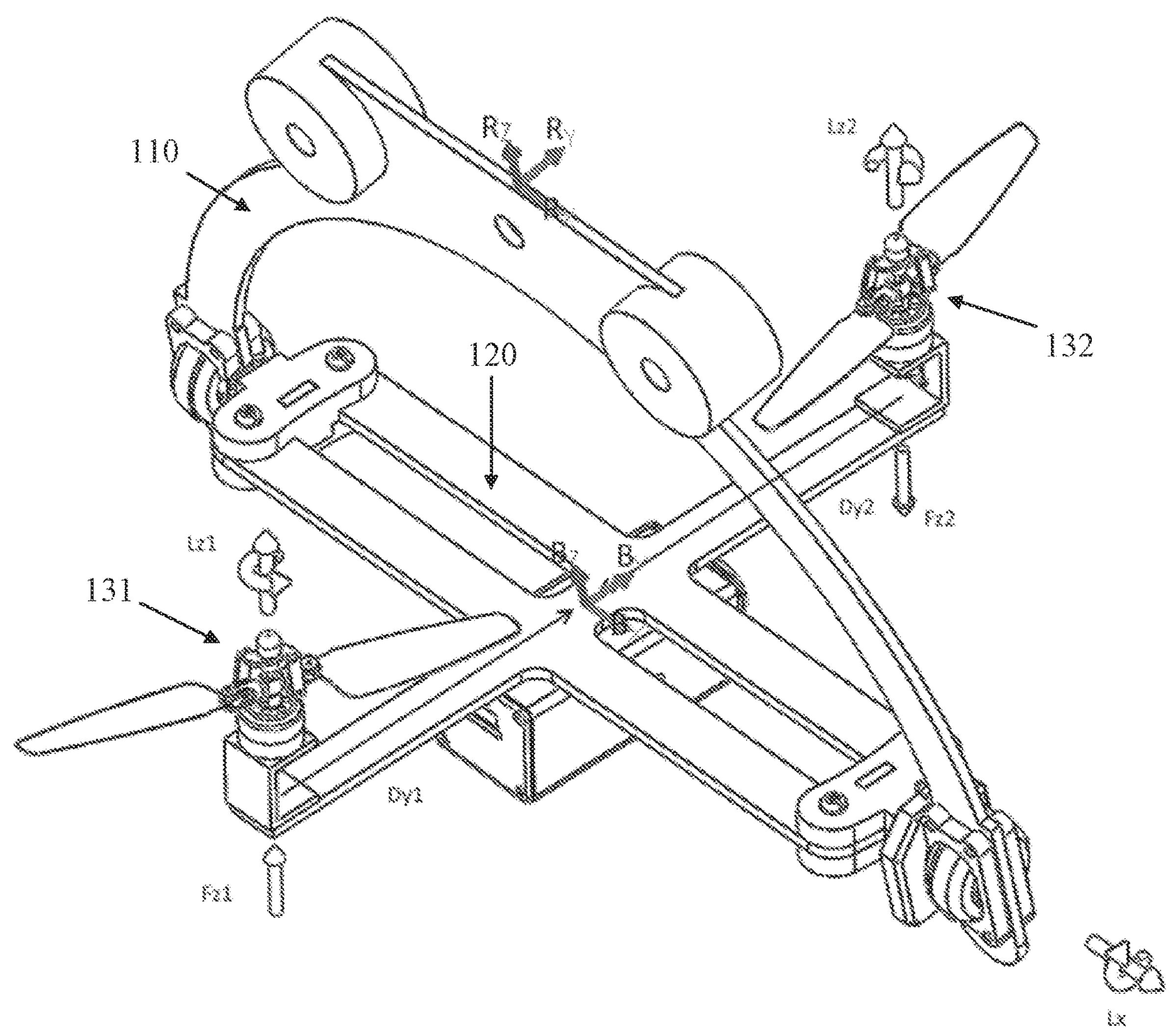
FIG. 4 is a schematic illustration of the system of FIG. 1 with notations, according to some embodiments of the present invention.

Reference is now made to FIG. 4, which is a schematic illustration of the system of FIG. 1 with notations, according to some embodiments of the present invention. Two coordinate systems are shown: a reference coordinate system associated with the platform mount 110 and marked by Rx, Ry and Rz; and a body coordinate system associated with the payload mount 120 and marked by Bx, By and Bz.

The distances of each of the rotors 131 and 132 from the Rx axis are equal ($Dy_1=Dy_2$). When the angular speed of rotor 131 is equal to the angular speed of rotor 132, the angular momentum of rotor 131 in Bz axis ($Lz_1$) is cancelled by the opposite direction angular momentum of rotor 132 in Bz axis ($Lz_2$). When the pitch of rotor 131 is equal to the opposite of the pitch of rotor 132, the force created by rotor 131 in the Bz axis ($Fz_1$) is cancelled by the opposite direction force created by rotor 132 in the Bz axis ($Fz_2$). In this case, the total torque in the Bx axis may be calculated by: $Tx=Fz_1 \times Dy_1+Fz_2 \times Dy_2$, and the angular momentum is calculated by: $dLx=Tx \cdot dt$, wherein integration over the time t gives the total angular momentum Lx.

When torque is applied in the Rz axis, angular velocity $\omega_z$ in the Rz axis is created, which changes the angular momentum $L_x$ in the rate of:

$$\frac{dL_x}{dt} = \omega_z \times L_x = \omega_z \times (I_x \cdot \omega_x) = T_y$$

wherein $L_x$ is moment of inertia in the Rx direction. However, since both angular velocities $\omega_z$ and $\omega_x$ are small, the residual induced torque is negligible. Such angular momentum $L_x$ also exists in any existing gimbal configurations.

Reference is now made to FIG. 5, which is a schematic illustration of a system for stabilizing a payload, having coaxial rotors, according to some embodiments of the present invention. Reference is now made to FIG. 6, which is an enlarged view of the rotors of the system of FIG. 5, according to some embodiments of the present invention. In this example, some forces are transferred from the system to the supporting platform; however these forces are still too small to carry the payload. System 500 includes rod 540 has a first rod end 541 connected to the payload mount 520 and a second rod end 542 connected to the propulsion device. The propulsion device includes two coaxial rotors 531 and 532 having the same axis of rotation 533 and opposite direction of rotation. Optionally, the axis of rotation 533 is perpendicular to the pivot axis 501.

Optionally, one or more of rotors 531 and 532 includes a swashplate 534 which is controlled by the stabilizing controller. The swashplate 534 moves along the rotation axis 533 of the rotor and changes the angle (pitch) of the rotor blades, thereby controls the linear force created by the rotor. By creating a difference between the angle of the blades of the rotor 531 and the angle of the blades of the rotor 532, a force perpendicular to the pivot axis 501 is created, which changes the orientation of the payload 200.

The angle of the blades of the rotors may be changed, for example, by a range of +/−45 degrees. The change in the angle (or, the command given to the blades to change the angle of attack at a time $t_k$) may be described by the following equation:

$$u_x(t_k) = u(t_{k-1}) + K_p\left[\left(1 + \frac{\Delta t}{T_i} + \frac{T_d}{\Delta t}\right)e(t_k) + \left(-1 - \frac{2T_d}{\Delta t}\right)e(t_{k-1}) + \frac{T_d}{\Delta t}e(t_{k-2})\right]$$

wherein: $e_x(t_k)$ is the error at time $t_k$ (which is the reference x-axis position of the gimbal minus the current x-axis position of the gimbal);

$$T_i = \frac{K_p}{K_i}$$

($K_p$ is the proportional gain and $K_i$ is the integral gain);

$$T_d = \frac{K_d}{K_p}$$

($K_d$ is the derivative gain); and $\Delta t = t_k - t_{k-} = t_{k-1} - t_{k-2}$. Optionally, a main rotor configuration is used, similar to a helicopter. The main rotor has a swashplate which translates the received instructions into an angle of each blade of the rotor separately, thereby changing the orientation of the payload 200.

Figure 7:
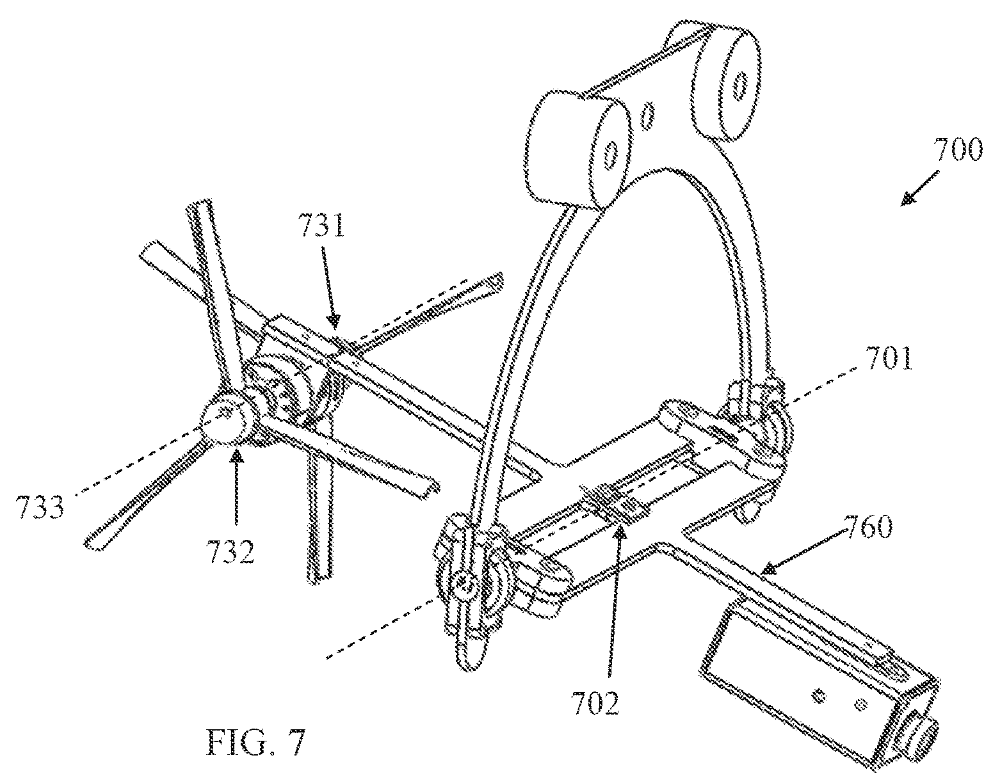
FIG. 7 is a schematic illustration of a system for stabilizing a payload, having coaxial spoon rotors, according to some embodiments of the present invention.
Figure 8:
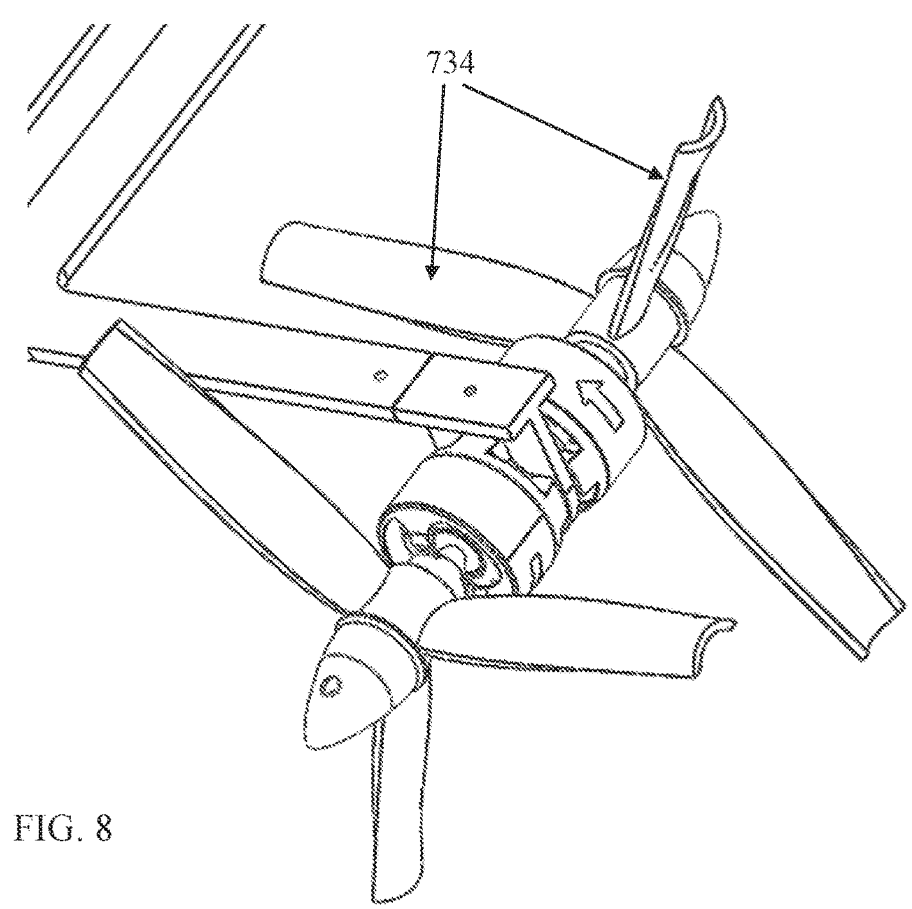
FIG. 8 is an enlarged view of the rotors of the system of FIG. 7, according to some embodiments of the present invention.

Reference is now made to FIG. 7, which is a schematic illustration of a system for stabilizing a payload, having coaxial spoon rotors, according to some embodiments of the present invention. Reference is now made to FIG. 8, which is an enlarged view of the rotors of the system of FIG. 7, according to some embodiments of the present invention. Optionally, system 700 includes a rod 760, wherein the payload 200 is attached at an end of the rod 760, at a distance from the pivot axis 701. The propulsion device includes two coaxial rotors 731 and 732 having the same axis of rotation 733 and opposite direction of rotation. The axis of rotation 733 is perpendicular to the pivot axis 701. The blades 534 of the rotors 731 and 732 are concave (spoon-shaped), so when the rotor is spinning, no linear force is created in the axis of rotation 733. By creating a difference in speed between the two rotors 731 and 732, a torque is created around the pivot axis 701, which changes the orientation of the payload 200. A sensor 702 is positioned, for example, on the rod 760.

Figure 9:
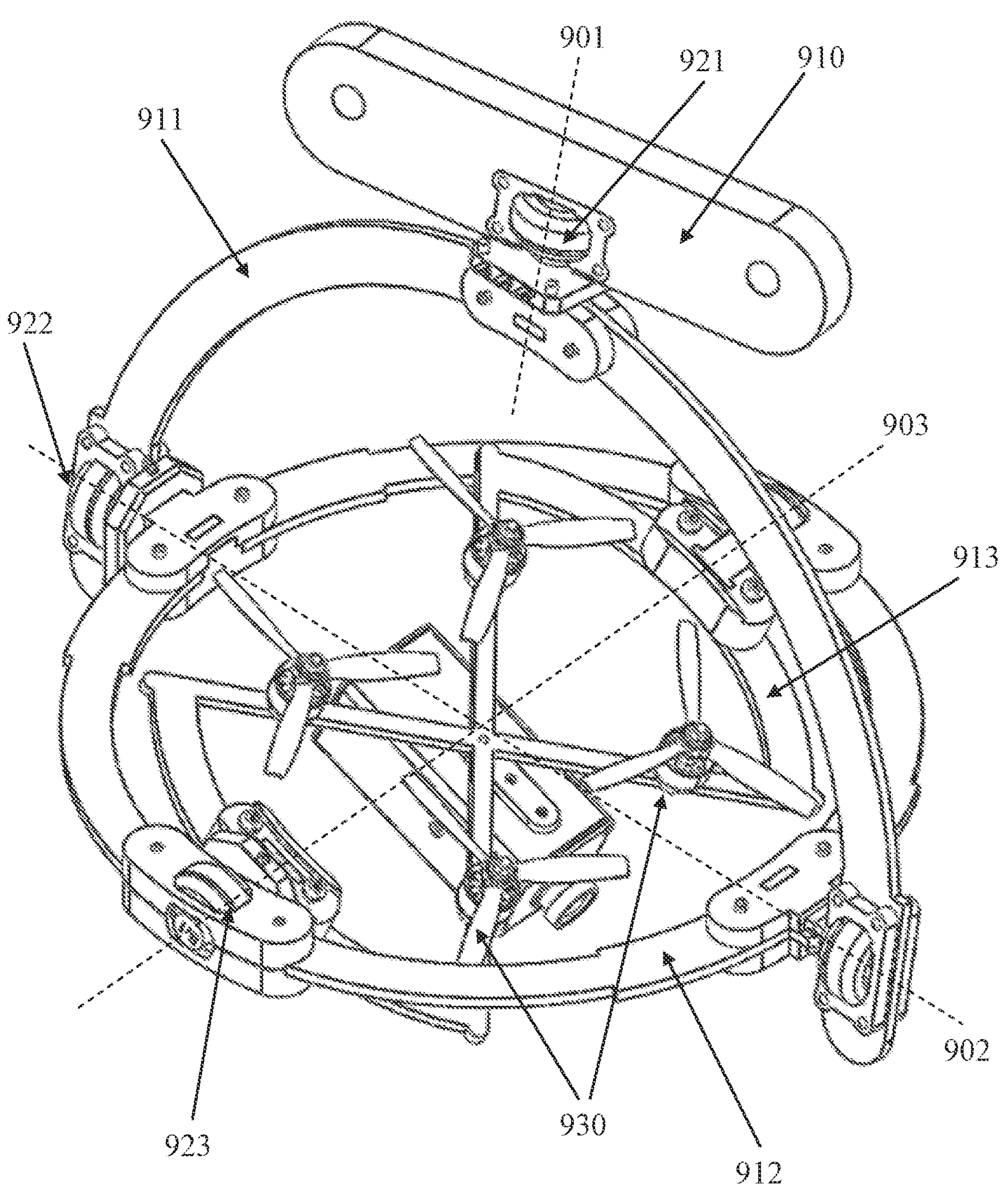
FIG. 9 is a schematic illustration of a system for stabilizing a payload, having concentric rigid structures, according to some embodiments of the present invention.

Reference is now made to FIG. 9, which is a schematic illustration of a system for stabilizing a payload, having concentric rigid structures, according to some embodiments of the present invention. The payload mount is connected to the platform mount 910 by a set of concentric rigid structures having orthogonal pivot axes. Platform mount 910 is connected via a ball bearing 911 to a structure 921 shaped as a half-ring, so they can rotate relative to each other via pivot axis 901. Structure 921 is connected via a ball bearings 912 to a structure 922 shaped as a ring, so they can rotate relative to each other via pivot axis 902. Structure 922 is connected via a ball bearings 913 to a structure 923 shaped as an X with circular parts, so they can rotate relative to each other via pivot axis 903. The payload mount may include any kind of rigid structure, for example X-shaped, Y-shaped, H-shaped and/or any other shape. The payload is connected to the center of the rigid structure 923, and the four propulsion devices 930 connected to outer edges of the rigid structure 923. Optionally, the propulsion devices 930 are arranged in a square arrangement around the center of structure 923. Optionally, the propulsion devices 930 are arranged so they are equally distanced from each other. Optionally, for each of the propulsion devices (rotors) 930, a coaxial rotor is added, as shown in FIG. 5, so forces created by propulsion devices 930 are cancelled. Since the system is free on all three axes, any torque created by the propulsion devices 930 is not transferred to the platform mount 910.

Figure 10:
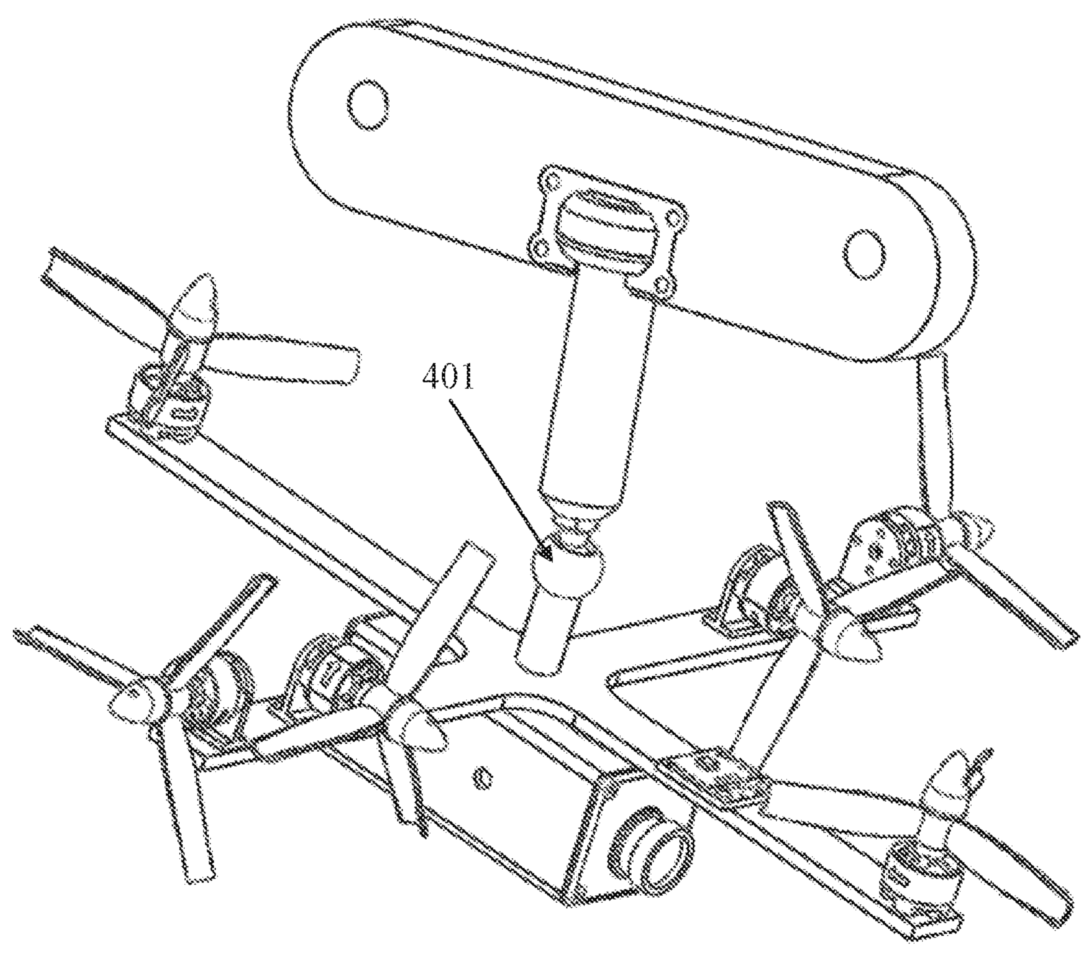
FIG. 10 and FIG. 11 are schematic illustration of systems for stabilizing a payload, having a ball joint, according to some embodiments of the present invention.
Figure 11:
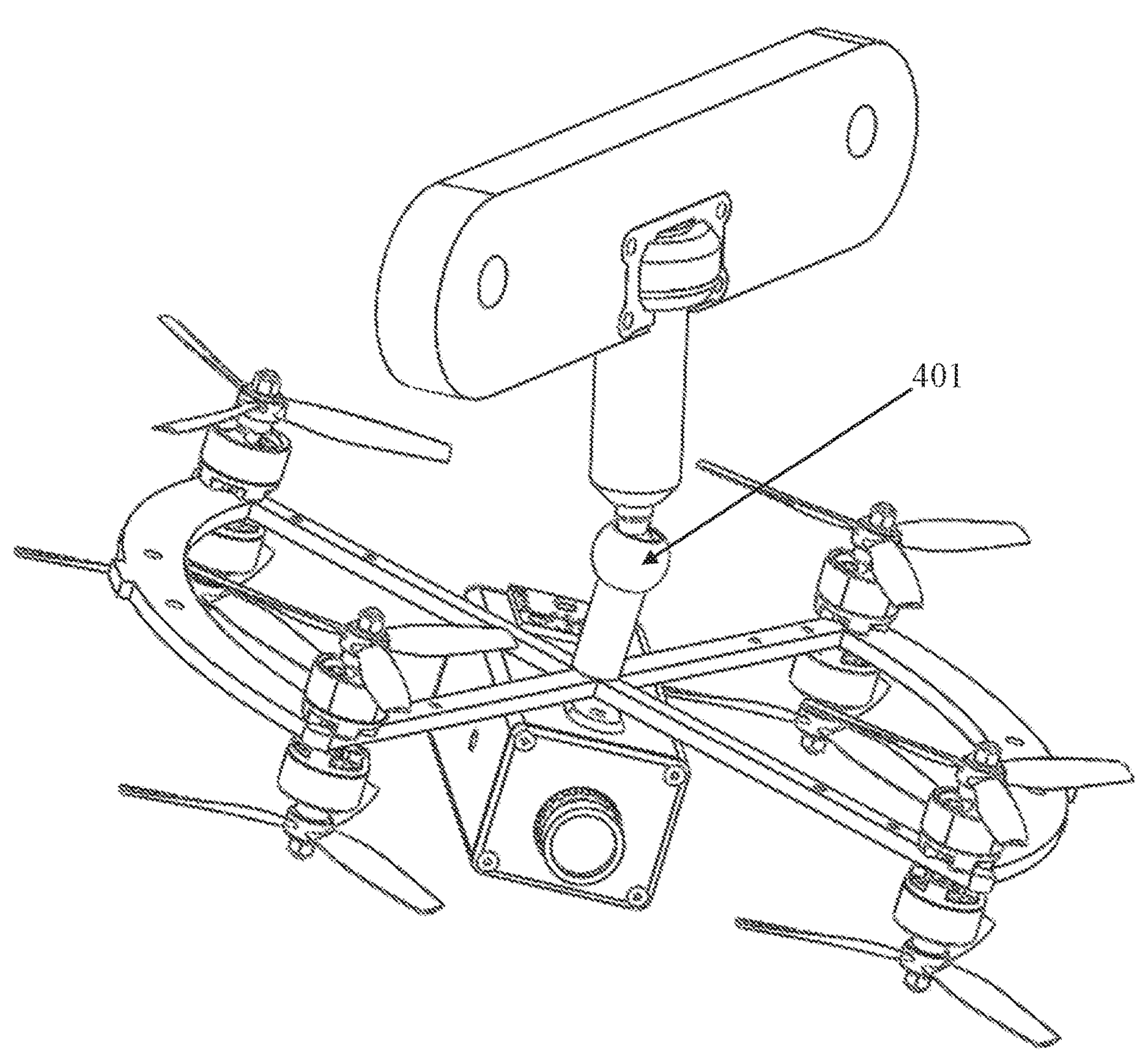

Reference is now made to FIG. 10 and FIG. 11, which are schematic illustration of systems for stabilizing a payload, having a ball joint, according to some embodiments of the present invention. The systems show different arrangements of the propulsion devices, while each propulsion device is balanced by an opposing propulsion device. The ball joint 401 is connecting the payload mount and the platform mount, and may allow rotational movement in two axes or three axes.

Figure 12:
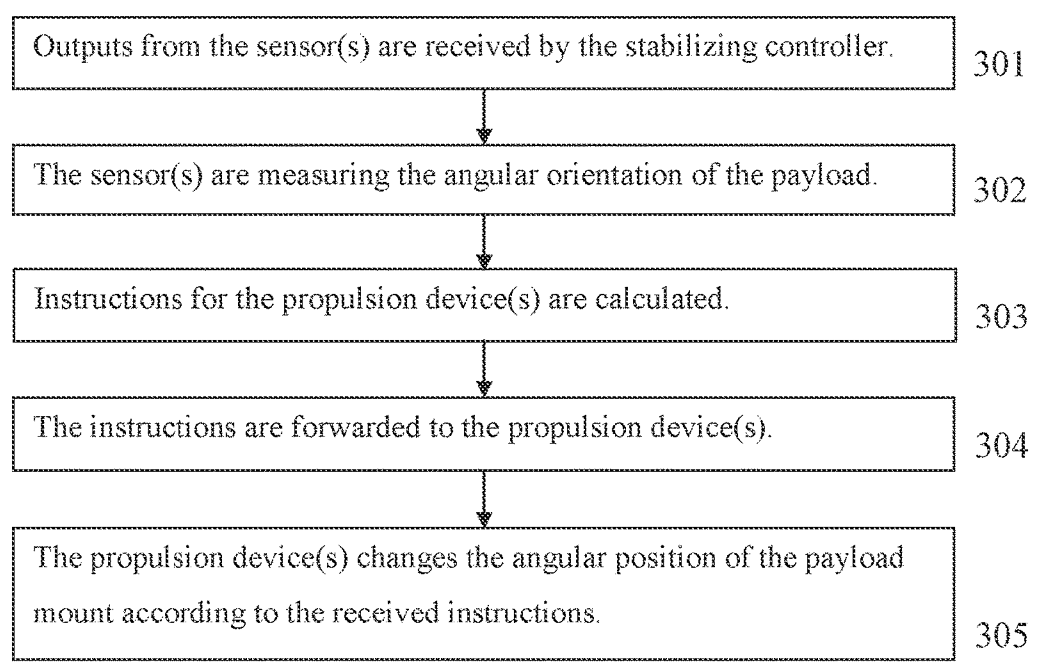
FIG. 12 is a flowchart schematically representing a method for stabilizing a payload, according to some embodiments of the present invention.

Reference is now made to FIG. 12, which is a flowchart schematically representing a method for stabilizing a payload, according to some embodiments of the present invention.

First, as shown at 301, the sensor(s) is measuring the angular orientation of the payload along the pivot axis.

Then, as shown at 302, outputs from the sensor(s) are received by the stabilizing controller.

Then, as shown at 303, instructions for the propulsion device(s) are calculated based on the received input. The instructions are calculated so the resulting movements of the propulsion devices minimize the sum of the linear forces and/or torques applied by the propulsion devices on the platform mount, so the platform maneuvers independently of the movements of the payload.

Then, as shown at 304, the instructions are forwarded to the propulsion device(s).

Finally, as shown at 305, the propulsion device(s) changes the angular position of the payload mount in the at least one pivot axis according to the received instructions.

Optionally, the control flow of the supporting platform and the stabilization system 100 may be described as coupled attitude control loops.

Figure 13:
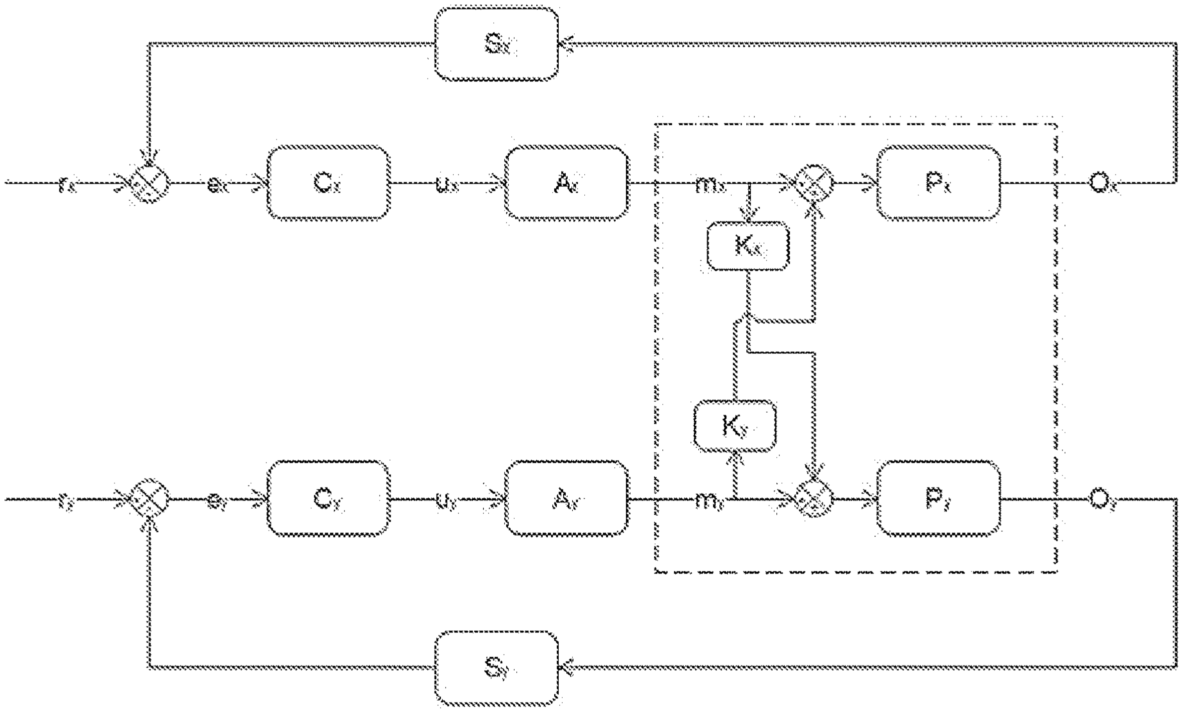
FIG. 13 is a control flow block diagram showing coupling between a stabilization system and the supporting platform, according to some embodiments of the present invention.

Reference is now made to FIG. 13, which is a control flow block diagram showing coupling between a stabilization system and the supporting platform, according to some embodiments of the present invention. In the diagram, the x notation represents the system 100 (gimbal), and the y notation represents the supporting platform. $r_x$ is the reference command of the gimbal (for example 15 degrees) and $r_y$ is the reference command of the platform (for example 0 degrees). $e_x$ and $e_y$ are the errors between current state and the reference command of the gimbal and platform respectively (for example 2 degrees). Cx and Cy are control transfer functions of the gimbal and platform respectively (for example proportional-integral-derivative (PID) controller). Ax and Ay are actuator transfer functions of the gimbal and platform respectively (for example a propulsion device such as a rotor operated by a motor). Px and Py are plant transfer functions of the gimbal and platform respectively. Ox and Oy are output responses of the gimbal and platform respectively. Sx and Sy are sensor transfer functions of the gimbal and platform respectively. $m_x$ and $m_y$ are moment outputs of the actuator for the gimbal and platform respectively. $k_x$ is the coupling transfer function from the gimbal to the platform and $k_y$ is the coupling transfer function from the platform to the gimbal. A coupling may be caused, for example, by friction, by a fixed axis or by a rotary motor connected to the platform in one side and to the gimbal in the other side. In embodiments of the present invention, $k_x$ is minimized, so little to no coupling from the gimbal to the platform exists.

Figure 14:
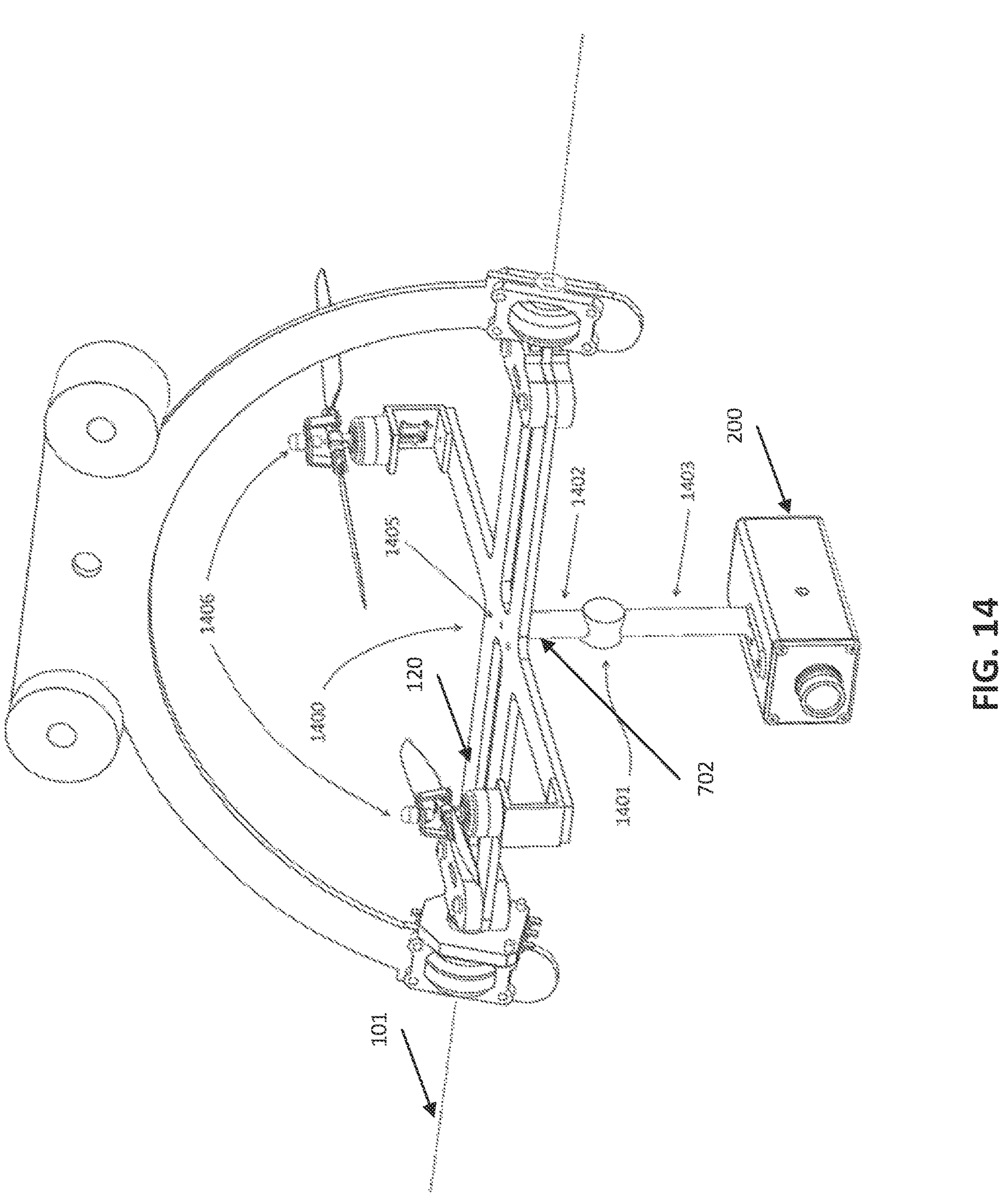
FIG. 14 is a schematic illustration of the system such that the center of mass (CM) is off the center of rotation, according to some embodiments of the present invention.

Reference is now made to FIG. 14 which is schematic illustration of a system for stabilizing a payload, having a center of mass off the pivot axis (PA) 101, the center off mass (CM) of a rotating part of the system 1400 is illustrated as a circle 1401. In this figure, a rod is connecting the payload to the payload mount. Part of the rod 1402 is between the CM and a nearest point on the pivot axis 101. The length of this rod is denoted herein d_CM_PA. The rest of the rod Is marked as 1403. The rotating part 1400 is at least two of the following: the propulsion device(s) 130 and the payload mount 520 and the payload 200, the sensor(s) 702 and stabilizing controller (not shown).

When the CM does not cross the pivot axis and a torque applied on the rotating part 1400, then a disturbance force is acting perpendicular to the pivot axis. When the CM does not cross the pivot axis, this disturbance force is mitigated by setting the d_CM_PA infinitesimally such that d_CM_PA is about zero or small enough in reference to a length of a max force vector length applied by the propulsion devices and a gravity force vector length. For instance, d_CM_PA may be set to comply with the following:

$$\text{d\_CM\_PA} < \text{d\_PD} \cdot \frac{PFS}{GFS}$$

where GFS denotes a gravitational force value, namely a vector length of gravitational acceleration multiply by a mass of the rotating part 1400, PFS denotes a propulsion device force value, namely a sum of lengths of all of the max force vectors length of the propulsion devices 1406, and d_PD denotes a distance between one of the propulsion devices to a nearest point on the pivot axis.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant platforms and/or payloads will be developed and the scope of the terms platform and payload is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for stabilizing a payload, comprising: a platform mount having a first end is physically connected to a supporting platform and a second end; the payload mount is physically connected to the payload, and is physically and rotatably connected via at least one pivot axis to the second end of the platform mount; at least one sensor for measuring angular orientation of the payload along the at least one pivot axis; at least one propulsion device connected to the payload mount, and angled to change an angular position of the payload mount along the at least one pivot axis; and a stabilizing controller for receiving outputs of the at least one sensor, calculating instructions for the at least one propulsion device, and forwarding the instructions to the at least one propulsion device; wherein the at least one propulsion device changes the angular position of the payload mount in the at least one pivot axis according to the received instructions while the supporting platform maneuvers independently of the movements of the payload and the stabilization system does not lift the payload into the air, wherein the calculated instructions include summing linear forces created by the at least one propulsion device and the instructions are calculated to minimize the sum of linear forces.

2. The system of claim 1, further comprising:

at least one rod perpendicular to the at least one axis, wherein the at least one rod having a first end connected to the payload mount and a second end connected to the at least one propulsion device.

3. The system of claim 1, further comprising:

at least one rod perpendicular to the at least one pivot axis, wherein the at least one rod is having a middle section connected to the payload mount and two ends, each connected to at least one of at least two propulsion devices.

4. The system of claim 3, wherein the at least two propulsion devices are located at equal distance from the at least one axis.

5. The system of claim 1, wherein the payload mount include a rigid structure, and wherein the payload is connected to the center of the rigid structure, and at least four propulsion devices are connected to outer edges of the rigid structure.

6. The system of claim 1, wherein the payload mount is connected to the second end of the platform mount via at least two concentric structures having orthogonal pivot axes.

7. The system of claim 1, wherein the at least one propulsion device includes:

(a) at least on rotor, and the calculated instructions include instructions to change at least one of a rotation speed of the rotor and an angle of blades of the rotor; and/or (b) two coaxial rotors having the same axis of rotation and opposite direction of rotation.

8. The system of claim 1, wherein the at least one propulsion device includes a rotor having a swashplate which translates the received instructions into an angle of each blade of the rotor.

9. The system of claim 1, wherein the payload mount is connected to the second end of the platform mount via at least one bearing which is positioned to allow movement along the at least one pivot axis.

10. The system of claim 1, wherein the payload mount is connected to the second end of the platform mount via a ball joint which allows rotational movement along at least two axes.

11. The system of claim 1, wherein the calculated instructions include calculating at least one of linear force, torque and drag created by each of the at least one propulsion device.

12. The system of claim 1, wherein the calculated instructions include summing torques created by the at least one propulsion device and the instructions are calculated to minimize the sum of the torques.

13. The system of claim 1, further comprising at least one power source which is powering at least one of the at least one propulsion device, the at least one sensor and the stabilizing controller.

14. The system of claim 1, wherein the supporting platform is controlled by a control processor, and wherein instructions created by the control processor are independent of the movements of the payload.

15. The system of claim 1, wherein the angular orientation is measured relative at least one of earth, a fixed object and the supporting platform.

16. The system of claim 1, wherein the at least one pivot axis is passing through a center of mass (CM) of a sum of at least two of the following members of a group consisting of: the at least one propulsion device and the payload mount and the payload the at least one sensor and stabilizing controller.

17. The system of claim 1, wherein a distance between the at least one pivot axis and a center of mass (CM) of a sum of at least two of the following members of a group consisting of: the at least one propulsion device and the payload mount and the payload the at least one sensor and stabilizing controller is set to comply with the following:

$$d\_CM\_PA < d\_PD \cdot \frac{PFS}{GFS}$$

where GFS denotes a vector length of gravitational acceleration multiply by a mass of a rotating part, PFS denotes a sum of all max forces vectors lengths of the at least one propulsion device, and d_PD denotes a distance between the at least one propulsion device from a nearest point on the pivot axis.

18. A method of stabilizing a payload, comprising: receiving outputs of at least one sensor, the at least one sensor for measuring angular orientation of a payload along the at least one pivot axis; calculating instructions for at least one propulsion device based on the received input; forwarding the instructions to at least one propulsion device which is connected to a payload mount supporting the payload, the payload mount is physically and rotatably connected via the at least one pivot axis to a platform mount physically and rigidly connected to a supporting platform; wherein the at least one propulsion device changes the angular position of the payload mount in the at least one pivot axis according to the received instructions while the supporting platform maneuvers independently of the movements of the payload; wherein, the at least one propulsion device (130) does not lift the payload into the air, wherein the calculated instructions include summing linear forces created by the at least one propulsion device and the instructions are calculated to minimize the sum of linear forces.

19. The system of claim 1, wherein the sum of the linear forces is smaller than a weight of the payload and the system.

* * * * *